Patented Feb. 18, 1941

2,231,979

UNITED STATES PATENT OFFICE 2,231,979

SULPHONATING PROCESS

Erhart Wolter, Dusseldorf-Benrath, Germany, assignor, by mesne assignments, to The Procter & Gamble Company, Cincinnati, Ohio, a corporation of Ohio No Drawing. Application May 15, 1939, Serial No. 273,724. In Germany May 19, 1938

8 Claims. (Cl. 260—686)

This invention relates to the sulphonation of organic compounds and more particularly to a process of producing sulphonates of alcohols and other organic compounds by reacting such compounds with salts of the addition product of sulphur tri-oxide with oxygen acids of nitrogen.

The use of metallic chlor-sulphonates as sulphonating agents is known in the arts but these agents are difficult to prepare, and furthermore, a relatively small proportion of their total content is effective in the sulphonation process. They also have the undesirable property of being highly hygroscopic making them unstable in storage and unsuited for commercial handling.

It is an object of this invention to provide a more highly efficient process for producing sulphonates of organic compounds. Another object of the invention is to provide a sulphonation process which is characterized by simplicity and speed of execution.

In accordance with this invention, sulphonatable organic compounds are reacted under readily attainable reactive conditions with the addition product obtained from sulphur tri-oxide and salts of oxygen acids of nitrogen, and as a result excellent yields of sulphonation products are obtained. Nearly all of the sulphur tri-oxide content of such addition product is effective in the sulphonation process, particularly when the product is derived from sodium nitrite.

The addition products of this invention may be produced in accordance with a process described by Traube in Berichte der Deutschen Chemischen Gesellschaft, volume 46, on page 2113, etc. Commercial yields of a preferred class of the addition products used in this invention may be produced by passing sulphur tri-oxide over pulverized sodium nitrite in a vacuum mixer containing a paddle scraper. Although the reaction is exothermic, it does not lead to the production of nitric oxide. Various molecular proportions of the sulphur tri-oxide can be taken up by the sodium nitrite, depending upon the length of the period of treatment, and may be varied from one to three moles of sulphur tri-oxide to each mole of sodium nitrite. When the desired amount of sulphur tri-oxide has been taken up by the sodium nitrite the excess sulphur tri-oxide is removed in a vacuum at temperatures ranging from 80° to 100° C. The addition products obtained according to this process are absolutely stable in the absence of water and are admirably suited for sulphonation processes, in general.

The process of this invention is especially adapted for the production of sulphonates of alcohols particularly higher molecular fatty alcohols. Among the fatty alcohols found suitable for sulphonation by the present process are: decyl, dodecyl, tetradecyl, hexadecyl, stearyl, and oleyl alcohol, and their commercial mixtures such as are obtained, for instance, by the reduction of naturally occurring fatty acids or fatty acid mixtures. Alcohols obtained by the reduction of carboxylic acids, such as those obtained by the oxidation of paraffin or by splitting waxes, sperm oil and the like have also been successfully sulphonated in accordance with the present invention.

In a special embodiment of the invention unsaturated alcohols are treated with the hereindescribed sulphonating agent. It has been surprisingly found in this embodiment that when using an equimolecular proportion of the reactants the double bonds of the unsaturated alcohols are not affected in the sulphonation process. A new process is therefore provided which produces sulphonated alcohols of unsaturated nature.

The process of the present invention is suitable for the sulphonation of compounds and compositions other than alcohols and is applicable to the treatment of such substances as olive oil, ricinus oil, benzene, naphthalene, phenol, naphthol and the like.

The sulphonation processes of this invention are preferably carried out at temperatures below 30° C. but higher temperatures may be used. Inert diluents, including, for instance, petroleum ether, chlorhydrocarbons such as tetrachlormethane and ethylene dichloride, and like diluents inert in sulphonation processes may be used if desired to facilitate the sulphonation process.

The following example is inclued merely to illustrate the process of the instant invention and is not to be considered in any way a limitation upon the scope of the invention.

Example

One hundred and sixty-three parts of an addition product obtained from sulphur tri-oxide and sodium nitrite containing 70% of sulphur tri-oxide and corresponding to 1 mole of sodium nitrite to 2 moles of sulphur tri-oxide are introduced in small quantities into a reaction chamber containing 350 parts of oleyl alcohol while the reaction mass is being stirred and cooled. During the introduction of the addition product the temperature of the reaction mass is allowed to rise to 35° C., whereupon the temperature is slowly increased to 65° C. After a short period of stirring the reaction goes to completion. Then the reaction product is neutralized with solid pulverized caustic soda. A high percentage yield of the sodium salt of oleyl alcohol sulphonate is obtained immediately. During this treatment process no gases are developed.

In the foregoing process the sulphonate may alternatively be neutralized with conventional aqueous alkaline solutions, and thereafter purified by washing the product in light benzine. The oleyl sulphonate produced by this process may be converted into powders or other forms through atomization or through other known methods for drying analogous materials.

It should be understood that the present invention is not limited to the specific reaction materials and reaction conditions described herein but that it extends to all equivalents which one skilled in the art would consider within the general purport of the instant disclosure and within the scope of the appended claims.

I claim:

1. A process for sulphonating organic compounds heretofore known to be capable of sulphonation which comprises sulphonating said compounds by reacting them with the addition product of sulphur tri-oxide and a salt of an inorganic oxygen acid of nitrogen.

2. A sulphonating process for sulphonating fatty organic substances which comprises reacting said substances with the addition product of sulphur tri-oxide and salts of inorganic oxygen acids of nitrogen.

3. A process for sulphonating organic compounds heretofore known to be capable of sulphonation which comprises sulphonating said compounds by reacting them with the addition product of sulphur tri-oxide and sodium nitrite.

4. A process of sulphonating higher molecular fatty alcohols which comprises sulphonating said compounds by reacting them with the addition product of sulphur tri-oxide and a salt of an inorganic oxygen acid of nitrogen.

5. The process of sulphonating higher molecular fatty alcohols which comprises reacting said alcohols with the addition products of sulphur tri-oxide and sodium nitrite.

6. The process of sulphonating unsaturated alcohols which comprises reacting said alcohols with the addition product of sulphur tri-oxide and salts of inorganic oxygen acids of nitrogen.

7. The process of producing sulphonated unsaturated alcohols which comprises reacting said alcohols with the addition product of sulphur tri-oxide and sodium nitrite.

8. A process for sulphonating organic compounds heretofore known to be capable of sulphonation which comprises sulphonating said compounds by reacting them with the addition product of sulphur tri-oxide and a salt of an inorganic oxygen acid of nitrogen in the presence of an inert diluent.

ERHART WOLTER.